United States Patent Office
3,347,627
Patented Oct. 17, 1967

3,347,627
PROCESS FOR MANUFACTURING SODIUM TRIMETAPHOSPHATE
Chung Yu Shen, St. Louis, Mo., assignor to Monsanto Company, a corporation of Delaware
No Drawing. Filed Dec. 20, 1963, Ser. No. 332,239
7 Claims. (Cl. 23—107)

ABSTRACT OF THE DISCLOSURE

Method for preparing a sodium trimetaphosphate containing product at temperatures below the melting point of the product. A mixture of a sodium halide and phosphoric acid having an Na/P ratio of from about 0.95 to 1.4 is heated at a temperature above about 275° C. but below about 625° C.

---

The present invention relates to novel processes for manufacturing inorganic phosphate products that contain significant amounts of sodium trimetaphosphate. More particularly, the present invention relates to improved calcining processes for manufacturing sodium trimetaphosphate products that contain essentially no water-insoluble metaphosphates.

For many commercial processes and applications in which sodium trimetaphosphate can be used, it is desirable that the sodium trimetaphosphate be practically completely soluble in water. Thus, in order for their products to be commercially acceptable, manufacturers of sodium trimetaphosphate have had to apply rigid limitations on their trimetaphosphate products as to their "insoluble metaphosphate" (commonly referred to as "IMP") content. According to published methods, the manufacture of sodium trimetaphosphates having very low levels of (or no) IMP was a very difficult task, and was usually prohibitively expensive. For example, manufacturers could calcine monosodium orthophosphate via conventional procedures at temperatures above about 450° C' until the IMP level of the product was reduced to an acceptable level. However, this procedure generally required a prolonged "soaking" period for the calcined material at temperatures above about 450° C., and for this reason were largely commercially impractical. The only other important conventional procedure available for manufacturing sodium trimetaphosphate products essentially free of IMP involved the actual melting of the raw materials at a temperature above about 625° C., followed by the crystallization of the sodium trimetaphosphate from the "melt" at slightly lower temperatures. The greatest disadvantage of this so-called "melt" procedure is due to the corrosiveness of the molten materials, and the concomitant necessity to use equipment for such processes made from special undesirably expensive corrosion-resistant materials. As a result of the commercial impracticality of these conventional procedures for manufacturing sodium trimetaphosphate, there is no one presently doing so in this country except on a laboratory or pilot plant scale.

The reaction of a sodium halide salt with phosphoric acid, as per Equation 1, below, represents potentially the most economical path to sodium trimetaphosphate products.

(1)  $3H_3PO_4 + 3NaX \rightarrow Na_3P_3O_9 + 3HX + 3H_2O$ (wherein X is a halide anion). However, it was believed heretofore that, in order to manufacture any alkali metal polyphosphate product from these raw materials, it was necessary to conduct the reaction via one of the so-called "melt" procedures (wherein the mixture is heated to a temperature above the melting point of the polyphosphate product and maintained in the "melt" form until substantially all of the HX by-product gas has been expelled from the "melt" before its temperature is lowered, and the polyphosphate salts then crystallized therefrom). The "melt" procedure was believed necessary heretofore because it was believed that such very high temperatures were essential for the relatively complete evolution of the undesired by-product HX gas. (If the HX gas was not expelled, it remained in the resulting product as NaX, along with some incompletely reacted acidic phosphates).

While experience with processes for the manufacture from sodium chloride plus $H_3PO_4$ of the relatively alkaline sodium polyphosphates such as sodium tripolyphosphate, sodium pyrophosphate, and mixtures thereof, i.e., wherein the Na/P ratios were higher than about 1.5 indicated that such high ("melt") reaction temperatures were necessary in order to cause the expulsion of a sufficient amount of the HX by-product gas from the reaction mixture to make relatively pure polyphosphate products, it has now been discovered that the information and facts gained from experience in the manufacture of these relatively more alkaline sodium polyphosphates are not necessarily applicable to processes for manufacturing sodium polyphosphate products having Na/P ratios below about 1.4. Thus, it has now been discovered, contrary to expectation, not only that sodium polyphosphate products containing at least about 25 weight percent of sodium trimetaphosphate that are substantially free of unreacted sodium halide (i.e., that contain less than about 5, and preferably less than about 2.5 weight percent of NaX) can be manufactured by reacting together a sodium halide salt and phosphoric acid at a temperature below the melting point of sodium trimetaphosphate; but also that the product resulting from this reaction contains essentially no IMP.

The remarkable results obtained by the practice of the present invention are illustrated by the following Example I.

Example I

Two hundred fifty four pounds of finely ground (—100 mesh) sodium chloride are mixed with 500 pounds of 85% orthorphosphoric acid. The temperature of the resulting mixture (a thin slurry of salt in $H_3PO_4$ initially) is then raised at a rate of about 7° C. per minute to about 400° C. When the temperature is between about 275° C. and about 400° C., effervescence is observed in the reaction mixture, and at a temperature of about 400° C., the reaction mixture solidifies. At this point the solidified reaction mixture contains about 81.0 weight percent of crystalline sodium trimetaphosphate, and about 3.4 weight percent of unreacted NaCl (based on analysis of the chloride content of the material). Over the next 15 minutes, the temperature of the solidified reaction mixture is raised to about 600° C. After keeping the product at this temperature for 10 minutes, the reaction mixture is allowed to cool to room temperature. Analysis of the resulting cooled material reveals that it is practically pure sodium trimetaphosphate, containing about ½ weight percent of sodium chloride, practically no pyrophosphates or orthophosphates, and no IMP. The product is substantially completely soluble in water, yielding a clear solution at a dissolved level of 15 weight percent in distilled water.

While in Example I, above, the temperature of the reaction mixture is shown being gradually raised through the calcining (conversion or reaction) temperature region in which both HX and "water of constitution" (due to the molecular dehydration of the intermediate phosphate materials) are evolved from the reaction mixture as gases, this is not the only manipulative procedure that can be utilized in the practice of the present invention. One can, for example, quickly heat the reaction mixture of NaX with phosphoric acid into the calcining region (of from about 275° C. to about 625° C.) if desired, and then maintain the temperature of the mixture at a single point within this region, if desired. The only essential feature that must be observed, regardless of the particular manipulative procedure utilized, in the practice of this invention is that the reaction mixture be held in the calcining temperature range for a sufficient amount of time, so that at least some sodium trimetaphosphate crystallizes out of the reaction mixture. Generally, such crystallization takes place after more than half of the halide has been evolved from the reaction mixture. Preferably the reaction mixture should be held within the calcining temperature range long enough for at least about 75% of the phosphoric acid to react with the sodium halide (as determined by disappearance of halide from the reaction mixture). Preferred calcining temperatures, exposure of mixtures of NaX plus phosphoric acid to which result in very fast conversion of these materials to trimetaphosphate and concurrent very swift elimination of the HX gas, are those within the range of from about 375° C. to about 625° C.

While the foregoing Example I is directed to the specific illustration of the production of relatively pure sodium trimetaphosphate, the technique described therein is equally applicable to the manufacture of mixtures of sodium trimetaphosphate with sodium tripolyphosphate containing at least about 25 weight percent of sodium trimetaphosphate. Thus, the ratio of Na/P in products made in accordance with the present invention can be varied within the overall range of from about 0.95 to about 1.4. Products having ratios of Na to P higher than about 1.45 cannot be made in the desired purity in this manner because of the significantly greater difficulty (described hereinbefore) in removing by-product HX from the resulting more alkaline reaction media. While products having Na/P ratios lower than about 0.95 can be made via the processes of this invention, as a practical matter, such products resulting from such processes are generally noncrystalline and very difficult to handle and use, and therefore have very little practical value at the present time. Ratios of Na/P within the range of from about 1 to about 1.2 are particularly preferred in the practice of this invention because of the relatively fast rate of evolution of HX from reaction media having such ratios, while for optimum results a ratio of about 1 is best of all.

The proportion of sodium halide and phosphoric acid reactants should be selected so that they have the same atomic ratio of Na/P as the ratio of Na/P in the desired final polyphosphate product. For example, to produce pure sodium trimetaphosphate, a ratio of about 1 should be used, while to manufacture a product containing about half sodium trimetaphosphate and half sodium tripolyphosphate, a ratio of about 1.30 should be utilized. Generally, any sodium halide salt (such as, for example, NaCl, NaF, NaI, NaBr) can be used as a reactant in these processes, but NaCl is preferred. Also, phosphoric acid can be used in practically any of the many forms in which it exists, such as in solution with water; in crude admixture with HCl such as "wet" process phosphoric acid made by acidulating phosphate rock with an excess of HCl; or even in admixture with $P_2O_5$ in the form of, for example, "superphosphoric acid," such as those having $P_2O_5$ contents up to as high as about 87 weight percent.

A particularly preferred embodiment of the present invention is illustrated by the following Example II. In this example, all parts are by weight unless otherwise specified.

*Example II*

Onto the surface of a hot (600° C.) agitated bed containing about 800 parts of minus ¼" size crystalline sodium trimetaphosphate in a conventional counter-currently heated rotary calciner are poured 100 parts of a thin, hot (200° C.) slurry containing 34.0 weight percent of sodium chloride and 56.5 weight percent of orthophosphoric acid (ratio of Na/P=1). The temperature of the resulting mixture is thereby lowered to about 420° C. While the calciner is slowly turned at a rate of about 10 r.p.m. its contents are heated during the next 15 minutes to a temperature of 610° C. at which point a sample indicates that substantially all of the halide has been evolved from the hot reaction mixture. The hot mixture is then withdrawn from the calciner, ground, screened while hot, and about 800 parts of the resulting −¼" fraction are returned to the calciner to form the hot bed to which another batch of hot NaCl—$H_3PO_4$ slurry can be added. The portion containing the large size fraction of about 59 parts is cooled and ground as the finished essentially pure, sodium trimetaphosphate.

Note that during the entire process illustrated by Example II, the material in the calciner retained its generally particulated, bowable, nonsticky form. This is in contrast to the process illustrated in Example I, above, where the temperature of the raw materials are simply raised (through a series of liquid and semi-fluid steps including initially a slurry of NaCl in $H_3PO_4$, and a viscous bubbling liquid during the later effervescent stages of the process below about 400° C.) until the desired crystalline product is formed. The particles of sodium trimetaphosphate coated with the NaX—$H_3PO_4$ slurry as in Example II will retain its particulated form so long as the crystalline (hot) bed particles represent at least about 80 weight percent, and preferably at least about 85 weight percent of the combined weight of crystalline (hot) bed particles, NaX, and phosphoric acid. In practice, it is also preferred that the relative temperatures of the NaX and phosphoric acid "raw" reactants (that are intermixed with the hot crystalline particles in the calciner) and the hot bed (just prior to the time they are intermixed), as well as the relative amounts of these materials that are intermixed in accordance with this particularly preferred embodiment of the invention be controlled so that the temperature of the resulting hot reaction mixture (NaX+phosphoric acid+hot crystalline polyphosphate) immediately after they are intermixed be not substantially below about 400° C. This can be accomplished in several ways, including, for example, preheating a blend or mixture of NaX plus phosphoric acid, using hot or even molten NaX, or simply using relatively small quantities of cold NaX and phosphoric acid as "raw" reactants.

The processes of the present invention can also be practiced in a continuous cyclical fashion such as that illustrated in the following Example III, wherein crude phosphoric acid (containing about 68 weight percent of water and about 6 weight percent of HCl is utilized as one of the "raw" reactants.

*Example III*

Into a conventional counter-currently heated, gas-fired rotary calciner fitted with flights that are slanted slightly downward from the horizontal in order to thrust the material inside the calciner slowly away from the charging end as the calciner turns are charged continuously 1200 parts per minute of a hot crystalline particulated (−40, +300 mesh) blend having an Na/P ratio of 1.15 and containing 72.5 weight percent of sodium trimetaphosphate and 25.5 weight percent of sodium tripolyphosphate. The temperature of the hot blend is 575° C. Into this hot blend just inside the calciner are poured continuously (from a series of relatively large nozzles fitted into the first 5 feet of the calciner so that the slurry poured therefrom is fairly well distributed over the surface of the hot blend) 100 parts per minute of a hot (110° C.) slurry containing 13.5 weight percent of powdered (−100 mesh) sodium chloride and 86.5 weight percent of the crude phosphoric acid described above. The average residence time in the calciner is 25 minutes. The exit temperature of the material from the calciner is 580° C. Hot calciner product containing about 1.2% chloride is then screened. Oversize (in this instance +40 mesh) material is then ground to pass through a 40 mesh screen and circulated back into the product stream. The product stream is then divided into two fractions, in a weight ratio of 12 to one. The smaller fraction is cooled and packaged, while the larger fraction is recycled to the charge or inlet end of the calciner.

What is claimed is:

1. A process for manufacturing a substantially water-soluble crystalline sodium trimetaphosphate product, which comprises maintaining the temperature of a mixture of phosphoric acid with at least one sodium halide salt at a temperature below the melting point of said trimetaphosphate product between about 275° C. and about 625° C. for a period of time sufficient to permit at least about half of said phosphoric acid to react with said sodium halide; whereby said sodium trimetaphosphate product crystallizes from the resulting reaction medium; the Na/P ratio in said mixture being between about 0.95 and about 1.4.

2. A process as in claim 1, wherein said temperature is above about 400° C., and said Na/P ratio is about 1.

3. A process as in claim 2, wherein said sodium halide is sodium chloride.

4. A process for manufacturing crystalline, substantially water-soluble sodium trimetaphosphate, which process comprises heating about a 1:1 molar mixture of sodium chloride and orthophosphoric acid to a temperature between about 400° C. and about 625° C.; maintaining the temperature of said mixture within said range until the resulting hot reaction product ceases to effervesce, whereby said crystalline sodium trimetaphosphate is produced.

5. A cyclical process for manufacturing a substantially water-soluble crystalline sodium polyphosphate product containing at least about 25 weight percent of sodium trimetaphosphate, which process comprises the steps of (a) introducing at least one sodium halide salt and phosphoric acid into a hot bed of crystalline particulated water-soluble polyphosphate solids containing at least about 25 weight percent of sodium trimetaphosphate to form a mixture of said solids, said sodium halide salt and said phosphoric acid; the initial temperature of said hot bed being between about 400° C. and about 625° C., and the total combined weight of said sodium halide salt plus said phosphoric acid intermixed with said hot bed being at most about half of the weight of said hot bed but less than the amount required to lower the temperature of said mixture to below about 400° C.; the Na/P ratio of said mixture being between about 0.95 and about 1.4;

(b) maintaining the temperature of said mixture between about 400° C. and about 625° C. for a period of time sufficient to permit substantially all of said phosphoric acid to react with said sodium halide;

(c) separating the resulting sodium trimetaphosphate product into at least two portions; and (d) utilizing one of said portions to form said hot bed into which said sodium halide salt and said phosphoric acid are introduced.

6. A cyclical process as in claim 5, wherein the Na/P ratio of said mixture is between about 1 and about 1.2; said sodium halide salt and said phosphoric acid are introduced together into said hot bed in the form of a slurry consisting essentially of said salt and said acid, the temperature of said hot bed just prior to the introduction of said slurry being between about 500° C. and about 625° C., and the weight ratio of said slurry to said hot bed being between about 1:20 and about 2:3; the temperature of said mixture being raised after said slurry is introduced into said hot bed to within the range of from about 500° C. to about 625° C. prior to said separating step.

7. A cyclical process as in claim 6, wherein said sodium halide salt is sodium chloride, and the Na/P ratio of said mixture is about 1.

References Cited

UNITED STATES PATENTS

| | | | |
|---|---|---|---|
| 2,280,848 | 4/1942 | Pole | 23—106 |
| 2,874,027 | 2/1959 | Gloss | 23—107 |
| 3,081,150 | 3/1963 | Beltz et al. | 23—106 |
| 3,210,154 | 10/1965 | Klein et al. | 23—106 |
| 3,233,968 | 2/1966 | Koebner et al. | 23—106 |

OSCAR R. VERTIZ, *Primary Examiner.*

O. F. CRUTCHFIELD, *Assistant Examiner.*